Aug. 19, 1941.   G. M. BIERLY   2,253,262
APPARATUS FOR BOILING AQUEOUS STARCH MIXTURES
Filed Oct. 24, 1939
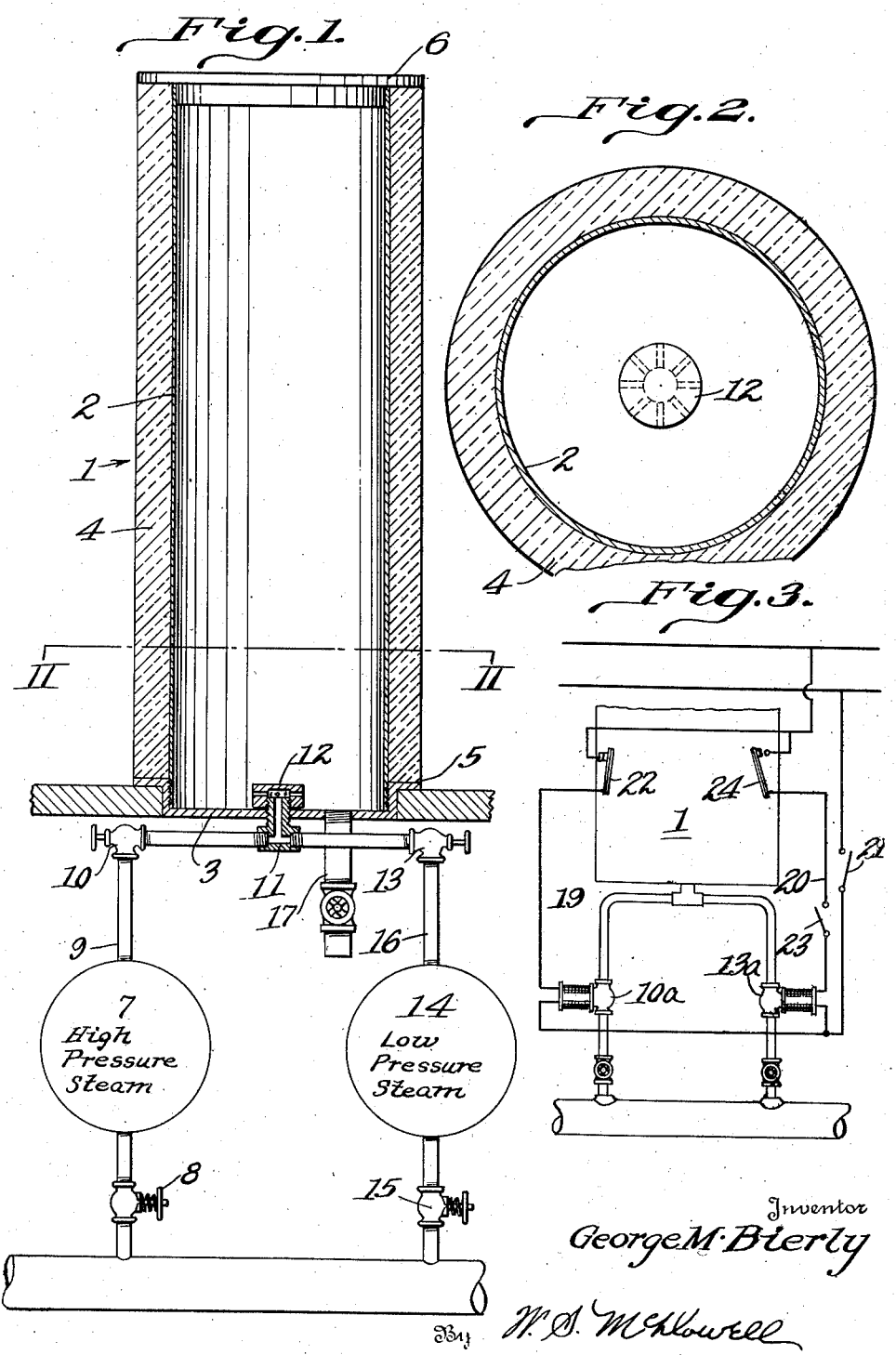
Inventor
George M. Bierly Patented Aug. 19, 1941

2,253,262

UNITED STATES PATENT OFFICE 2,253,262

APPARATUS FOR BOILING AQUEOUS STARCH MIXTURES

George M. Bierly, Columbus, Ohio

Application October 24, 1939, Serial No. 301,083

1 Claim. (Cl. 127—28)

This invention relates to an improved apparatus for boiling starch, and has for its general object the provision of an improved means by which various types of laundry and other commercial starches may be subjected to regulated conditions of boiling in water to produce starch pastes of uniform viscosity for various industrial and other uses, or for the purposes of accurately determining and controlling the boiling characteristics of such starches at the time of their manufacture.

Commercial starches are classified according to their pasting characteristics into thick and thin boiling categories. Ordinary laundry starch is typical of the thin boiling class when a 5 per cent. water mixture pastes into a thin translucent syrup scarcely gelatinous at boiling temperature. Cornstarch, such as sold for food, when mixed with boiling water in the above proportion, forms a considerably thicker body and is characteristic of a thick-boiling starch. It is now known that these variations in pasting properties of starch of different kinds are largely dependent upon the conditions of manufacture and that thick-boiling starches can be made thin-boiling by suitable treatment.

These properties, as well as the degree of gelatinization of the cold paste, are of great importance in preparing starches for certain trades. In laundry work and textile manufacture, for instance, the demand for a paste thin enough when hot to penetrate the fabric and not just coating the surface and at the same time having sufficient body to give the requisite binding properties, make certain types of thin-boiling starches highly desirable. Thin-boiling starches are also used quite extensively in confectionery. In other industries, as in paper box manufacture, and in certain lines of textile work, thick-boiling starches are required.

In accordance with the present invention, starch boiling apparatus is provided by means of which a mixture of starch and water in definite proportions may be quickly brought to a boiling temperature and the mixture uniformly maintained at a definite boiling rate for a required period of time so that the resulting cooked mixture may be subjected to suitable viscosimetric tests to readily and accurately determine the boiling properties of the starch or starches undergoing such tests.

For a further understanding of the invention, reference is to be had to the following description and the accompanying drawing wherein:

Fig. 1 is a vertical sectional view taken through the starch boiling apparatus formed by the present invention;

Fig. 2 is a horizontal sectional view on the line II—II of Fig. 1.

Fig. 3 is a diagrammatic view showing a modified form of my invention.

Referring more particularly to the drawing, the numeral 1 designates the boiler unit of my improved starch cooking apparatus. This unit comprises a metallic cylinder 2, threaded at its lower end to receive a cup-shaped bottom member 3. Surrounding the cylinder is a body 4 of a suitable heat insulating material, the lower portion of this body resting on an out-turned horizontal flange 5 of the bottom member 3. The normally open top of the cylinder 2 may be closed by a loose fitting removable lid 6.

A mixture of starch and water, with the components of the mixture present in known or predetermined quantities, is placed in the cylinder 2 through its open top, and after such placement, the lid 6 is positioned to close the top of the cylinder, as disclosed in Fig. 1. Steam is introduced to the cylinder from a drum 7 in which the steam is maintained at a suitable pressure by means of a pressure regulating valve 8 disposed between the drum and a supply line. A pipe line 9 having a manually operated control valve 10 conducts the steam from the drum 7 to the cylinder. After passing through the valve 10, the steam flows into an inverted T-shaped fitting 11, which is screw threaded into an opening formed in the bottom member 3 of the cylinder 2. The upper end of the fitting, where it enters the cylinder 2, is equipped with a ported steam-distributing head 12 so that high pressure steam of the order of 20 pounds per square inch, obtained from the drum 7, will be disseminated throughout the interior of the cylinder, causing agitation of the aqueous starch mixture and rapidly raising the temperature of such mixture to the boiling point.

This operation is continued for a relatively short period of time until the temperature of the mixture has been raised to its active boiling point. When this condition is secured, the valve 10 is closed, arresting steam flow from the drum 7 to the cylinder 2. At the same time or immediately after this operation, a second manually operated valve 13 is opened, which establishes a flow of steam from a drum or header 14, through a pipe line 16 to the fitting 11. The steam in the header 14 is maintained under a suitably reduced pressure by a second regulator 15 and is admitted into the cylinder 2 through the ported distributor head 12. Low pressure steam at a pressure of the order of 8 ounces per square inch is permitted to flow into the cylinder in sufficient volumes to maintain the aqueous starch mixture at a uniform boiling rate. Usually this period is of fixed or arbitrary duration. Ordinarily the entire operation is completed in less than twenty minutes, although this period may be extended to ninety minutes or longer. The closure 6 may be ported, if desired, to relieve the interior of the cylinder of pressure, or said closure may be sufficiently loose fitting in its association with the top of the cylinder 2 to obtain this function.

At the conclusion of the boiling or cooking period, the control valve 13 is closed, and the mixture withdrawn from the bottom of the cylinder by way of a valved outlet 17. If the operation is one intended for the purpose of determining the viscosity of the cooked mixture, the latter may then be placed in a Scott or other viscosimeter and a determination made. In this connection, the apparatus forming the invention is particularly useful in the control laboratories of starch manufacturing plants since the paste is prepared under controlled commercial conditions. However, the apparatus is also useful in various laundry or textile establishments for the purpose of boiling starch under accurately controlled conditions prior to actual use of the starch. It will also be understood that a plurality of the cylinders 2 may be connected with the drums 7 and 14 and used in battery-like order so that any desired number of cooking operations may be carried on simultaneously.

The admission of steam into the cylinder or kettle in the manner described provides for uniform agitation of the mixture while it is being heated as it is maintained at a uniform boiling rate, assuring uniform dispersion of the starch particles throughout the mixture and complete action of the heated liquids thereon. Preferably, when the mixture is initially formed and placed in the cylinder or boiler, the measured water component should possess a definite temperature, as, for instance, 45 degrees C.

It will be understood that the boiling operation may be carried out so that a definite volume of the mixture will be contained in the boiler at the conclusion of the operation, since it is a simple matter to ascertain and control the amount of steam supplied to the boiler and determine in advance the extent of condensation thereof in the mixture while it is being cooked.

If desired, as shown in Fig. 3, the change-over from high-pressure to low-pressure operation may be accomplished automatically by the provision of the solenoid valves indicated at 10a and 13a. The solenoid coils of these valves are arranged in the circuits disclosed at 19 and 20. The circuit 19 is provided with a manual switch 21 and a thermostatic switch 22, the latter being responsive to the temperature of the mixture in the boiler 1. The switch 22 may be of the usual bi-metallic type and normally serves to maintain the circuit 19 closed. When the temperature of the mixture in the boiler reaches the boiling point, the switch 22 flexes to a circuit opening position, thus interrupting the circuit 19 and deenergizing the coil of the valve 10a, allowing the latter to close under spring pressure or other form of valve loading. The circuit 20, in which the solenoid coil of valve 13a is positioned, is provided with a manual switch 23 and a bi-metal thermostatic switch 24. The switch 24 is responsive to the temperature of the starch mixture in the boiler, so that when said mixture attains a boiling temperature, the switch 24 automatically closes the circuit 20, thus effecting the opening of the valve 13a against its normal loading and permitting the flow of low-pressure steam into the boiler. If desired, the switch 23 may be of the time-controlled type, so that at the end of a predetermined period, it automatically will effect the opening of the circuit 20, thus terminating the boiling period of the starch mixture.

If desired, a three-way cock may be operated with one operation of the thermostatic switch closing the high pressure port and opening the low pressure port.

What is claimed is:

Starch boiling apparatus comprising a boiler adapted for the reception of an aqueous starch mixture, a source of steam supply, steam conducting means leading from said source of steam supply to the interior of said boiler, a second steam conducting means independent of said first-named means for leading steam from said source of supply to the interior of said boiler, means in said first-named steam conducting means for delivering steam through said boiler at a given pressure, means in said second steam conducting means for controlling the flow of steam therethrough to deliver steam to said boiler at a lower pressure than said first means, a shut-off valve in each of said steam conducting means, and means responsive to the temperature of the aqueous starch mixture in said boiler to effect the automatic closing of the shut-off valve in said first steam conducting means and the opening of the shut-off valve in the second steam conducting means when said mixture attains a predetermined temperature.

GEORGE M. BIERLY.